(12) United States Patent
Chen et al.

(10) Patent No.: US 6,758,449 B1
(45) Date of Patent: Jul. 6, 2004

(54) ALL-PURPOSE ROLLER STAND

(76) Inventors: Nick Chen, No. 64-2, Chiu Shen Lane, Chiu-Shen, Tun Area, Taichung (TW); Steve Donald Krohmer, 3624 115th Ave. NW., Coon Rapids, MN (US) 55433

( * ) Notice: Subject to any disclaimer, the term of this patent is extended or adjusted under 35 U.S.C. 154(b) by 0 days.

(21) Appl. No.: 10/347,462

(22) Filed: Jan. 22, 2003

(51) Int. Cl.[7] .................................................. A47G 23/02
(52) U.S. Cl. ....................................................... 248/146
(58) Field of Search ........................ 248/229.1, 146, 248/229.15, 229.13, 227.2, 534, 539

(56) References Cited

U.S. PATENT DOCUMENTS

| | | | | |
|---|---|---|---|---|
| 2,586,636 A | * | 2/1952 | Fischer et al. ................... 269/4 |
| 3,572,620 A | * | 3/1971 | Kincaid et al. ................ 73/462 |
| 3,602,492 A | * | 8/1971 | Petrie .......................... 269/296 |
| 4,039,178 A | * | 8/1977 | Odames ........................ 269/75 |
| 4,094,497 A | * | 6/1978 | Stratton ........................ 269/71 |
| 4,492,354 A | * | 1/1985 | Rice .......................... 248/163.1 |
| 4,715,488 A | * | 12/1987 | Hewitt et al. ............. 193/35 R |
| 4,852,623 A | * | 8/1989 | Rodrigues .................... 144/287 |
| 4,903,796 A | * | 2/1990 | Magyar et al. ............. 182/129 |
| 5,064,156 A | * | 11/1991 | Handler et al. ............. 248/168 |
| 5,247,976 A | * | 9/1993 | Matthews .................... 144/287 |
| 5,299,656 A | * | 4/1994 | Grill ......................... 182/186.4 |
| D360,953 S | * | 8/1995 | Sheftel .......................... D25/67 |
| D361,390 S | * | 8/1995 | Sheftel .......................... D25/67 |
| 5,664,750 A | * | 9/1997 | Cohen ................... 248/231.71 |
| 6,095,319 A | * | 8/2000 | Noniewicz et al. ......... 198/632 |
| D432,246 S | * | 10/2000 | Pestone ........................ D25/67 |
| 6,179,116 B1 | * | 1/2001 | Noniewicz et al. ......... 198/632 |
| 6,575,213 B1 | * | 6/2003 | Houk .......................... 144/287 |
| 2003/0037841 A1 | * | 2/2003 | Bissonnette ................. 148/196 |
| 2003/0041711 A1 | * | 3/2003 | McKee .......................... 83/13 |
| 2003/0075033 A1 | * | 4/2003 | Speakman ................. 83/477.2 |
| 2003/0080267 A1 | * | 5/2003 | Eslick ..................... 248/229.1 |

* cited by examiner

Primary Examiner—Leslie A. Braun
Assistant Examiner—Kofi Schutterbrandt
(74) Attorney, Agent, or Firm—Browdy and Neimark, P.L.L.C.

(57) ABSTRACT

An all purpose roller stand is provided by the present invention including a fixing standard with a pincher area so that said fixing standard can be fixed beside a working table. Said fixing standard has an angle-fixing portion thereof. A rotator pivots on said fixing standard. Said rotator can be fixed by said angle-fixing portion. Said rotator has plughole thereof. A T shape trestle has a transversal pole with a roller portion thereof and a longitudinal pole thereof. Said trestle can be mounted on said rotator by plug said longitudinal pole into said plughole.

7 Claims, 10 Drawing Sheets

ALL-PURPOSE ROLLER STAND

FIELD OF THE INVENTION

The present invention relates to a roller stand or a roller ball stand, and more particularly to an all-purpose roller stand.

BACKGROUND OF THE INVENTION

There are three types of the roller stand or a roller ball stand in our daily life for the most part. The first type is a basic roller stand as shows in FIG. 1. The basic roller stand does not have any specially function or structure. The basic roller stand formed by a U shape chassis 1 and a roller portion 2. The roller portion can be a rolling axis or a line of friction balls. But, how to use or fix the basic roller stand and how to adjust the operation height will be a problem and all depend on the user. So the basic roller stand is not convenience. The second type of the roller stand is a standing roller stand shows in FIG. 2. In addition to the chassis 1 and the roller portion 2 that stated above the standing roller stand has a stand 3 thereof for stand more over. The stand 3 can adjust the operation height easily but cannot stand very stability. The third type of the roller stand is a skid roller stand shows in FIG. 3. The skid roller stand has two T shape trestle 5 fixed on each side of the skid buck 4. Each one of said T. shape trestle has a roller portion 6 thereof. Although the skid roller stand can stand stability but it is heavy huge and the roller portion on the skid buck is fixed. It can not move turn or rotate. So the shape of the work material that can fit to the skid roller stand will be limited. For example, the tube shape material will not be able to put on the skid roller stand.

SUMMARY OF THE INVENTION

The primary objective of the present invention is to provide an all-purpose roller stand, which can stand stability and operate and be fixed easily.

To achieve the aforesaid objective, an all-purpose roller stand provided by the present invention comprises a fixing standard with a pincher area. Said fixing standard can be fixed on or beside a standard by said pincher area. There is a plughole at one side of said fixing standard and a height-fixing portion located at one side of said plughole. A T shape trestle has a transversal pole and a longitudinal pole. Said transversal pole has a roller portion. Said trestle can be mounted on said fixing standard by inserting said longitudinal pole into said plughole.

DETAILED DESCRIPTION OF THE INVENTION

Figure 1:
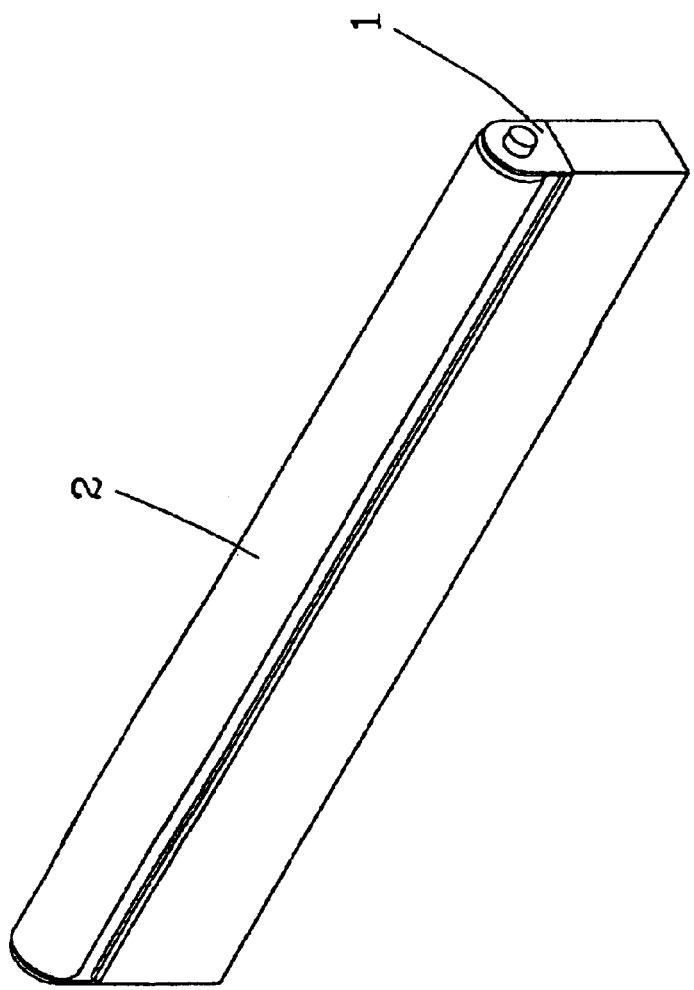
FIGS. 1–3 are views of prior art roller stands.
Figure 2:
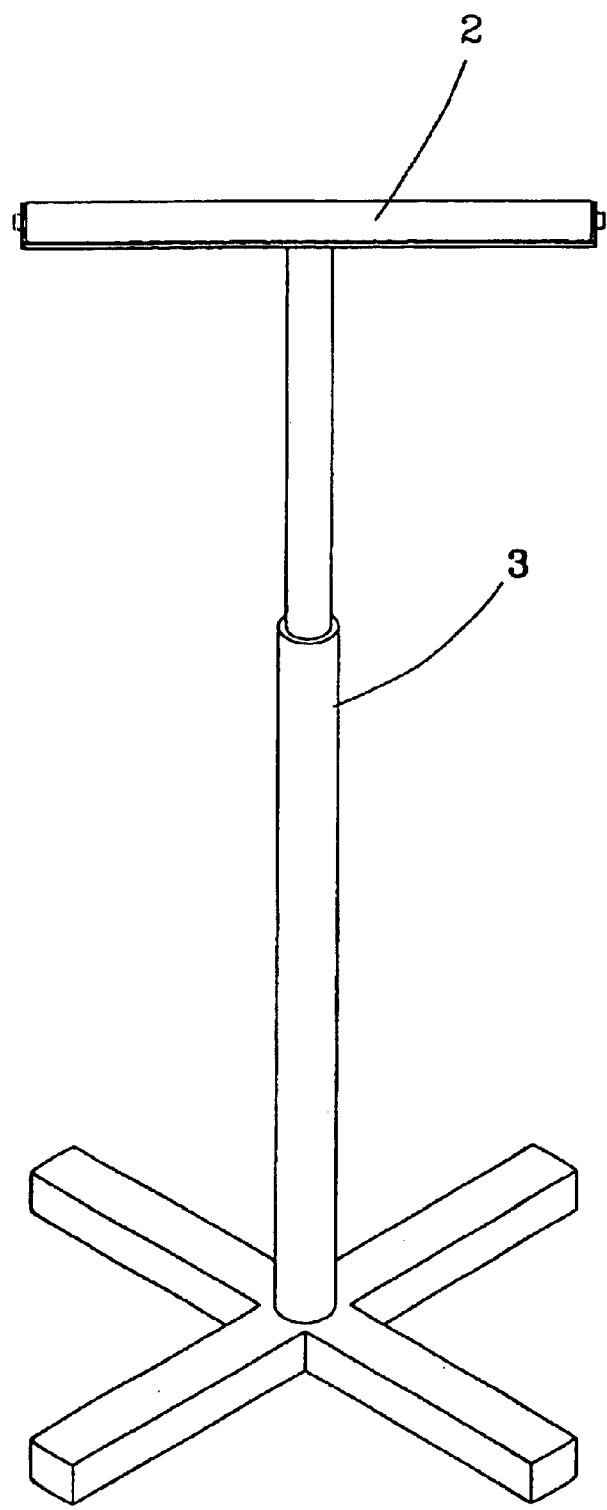
Figure 3:
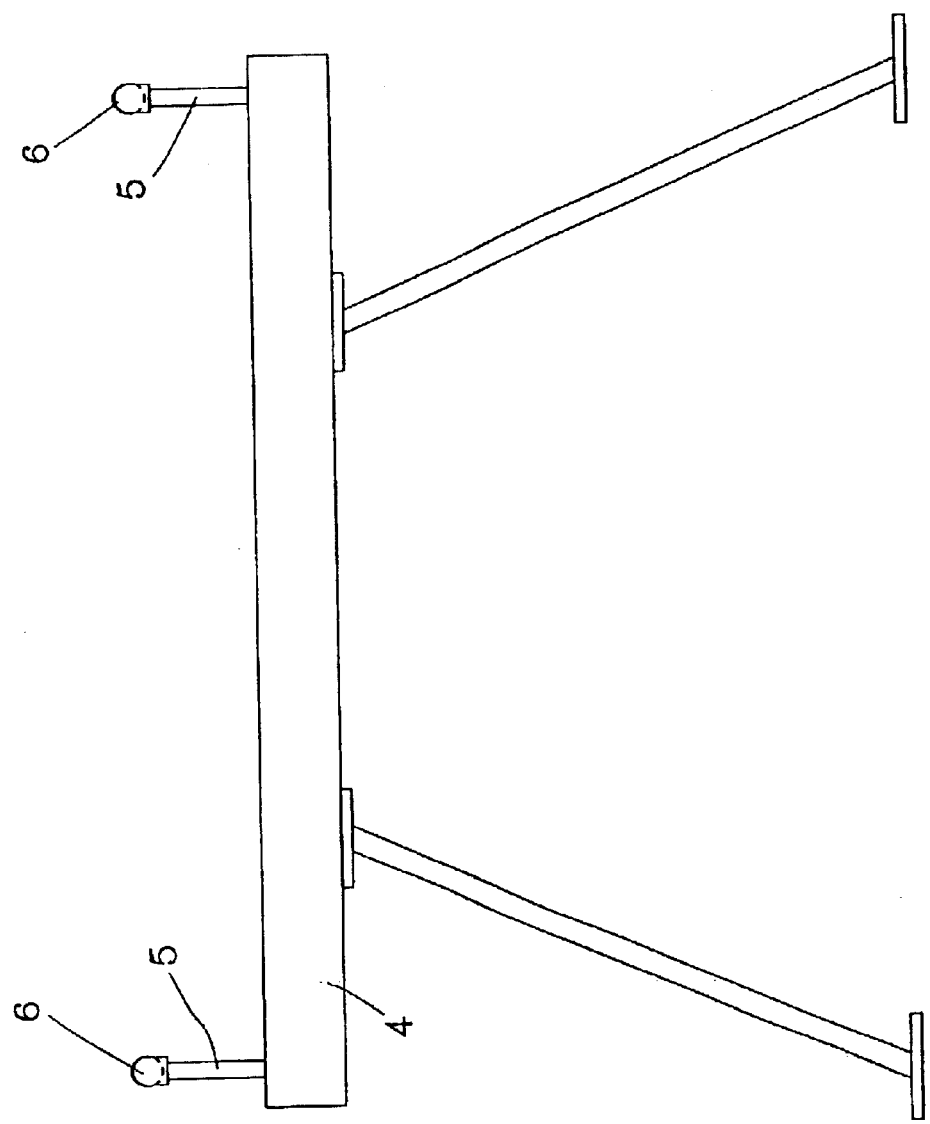

As show in FIG. 4 to FIG. 7, the all-purpose roller stand of present invention comprises:

A fixing standard 100 having a top portion 101□a side portion 102 and a bottom portion 103. Said fixing standard 100 has a standing wall 104 surrounding said top portion 101□side portion 102 and bottom portion 103. Said bottom portion has a screw hole 105 with a lug 106 inside. Said lug has a grip 107 at one end and a press plate 108 at the other. There is a pincher area 109 formed between the bottom of said top portion 101 and said press plate 108. Said press plate can move forward to said top portion by rotating said grip 107 and make said pincher area to clap beside the working table and fix said fixing standard beside the working table. There is an embowed umbo 110 on said standing wall 104 at the shoulder of said top portion 101 and said side portion 102. Each inner side of said umbo has a column 111 thereof. Each of said columns has a hole 112. There is a first pivot 113 located between said two holes of the columns. Said first pivot has a screw 114 at one end thereof and has a stem 115 at the other thereof. Such that said first pivot and stem and screw can form an angle-fixing portion 120.

There is a rotator 130 pivoted between said two columns around which the two columns can be pivoted. Said rotator has a perforation 131 and said first pivot threads through it. Said two columns can be clapped against the rotor by rotating said first pivot 113 and fixing the rotator between said two columns. Said rotator 130 has a plughole 132 thereof. In order to set a trestle in a X-axis and Y-axis direction, the plughole is a square hole in this embodiment. Said plughole also can be another shape. For example said plughole can be a circular hole and the operating direction will not be limited in any way so that user can adjust the trestle to any direction. There is a breach 133 at one side of said plughole. Said rotator has a beetle part 134 with a through hole 135 at each side of said breach 133. A second pivot 136 with screw 137 at one end thereof and a stem 138 at the other thereof threads through said through holes 135. Such that said second pivot 136 and stem 138 and screw 137 can form a height-fixing portion 140 for the trestle in rotor 130.

A T shape trestle 200 has a transversal pole 201 thereof and a longitudinal pole 202 thereof. Said trestle 200 can be mounted on said rotator 130 by inserting said longitudinal pole 202 into said plughole 132 and fixing said height-fixing portion 140. Said transversal pole has a roller portion 210 thereof including a rotating portion which can be a rolling cylinder or a line of friction balls. Said rotating portion is a rolling cylinder 213 in this embodiment. Said roller portion 210 has a long plate 211. At each side of said long plate is a side plate 212. The rolling cylinder 213 pivots between said two side plates 212. Said long plate has a long slot 214 parallel to its major axis. Each end of said transversal pole has a fixer 203. A bolt 204 fixed on a depressor plate 205 and a wing nut 206 in this embodiment form said fixer 203. Said depressor plate 205 is located between said long plate 211 and said rolling cylinder 213 and said bolt 204 on the depressor plate is mounted through a plate 207 fixed on the end of pole 202 and said long slot 214. So that said rotating portion can move along with said long slot and be fixed by wing nut 206 of said fixers.

Figure 4:
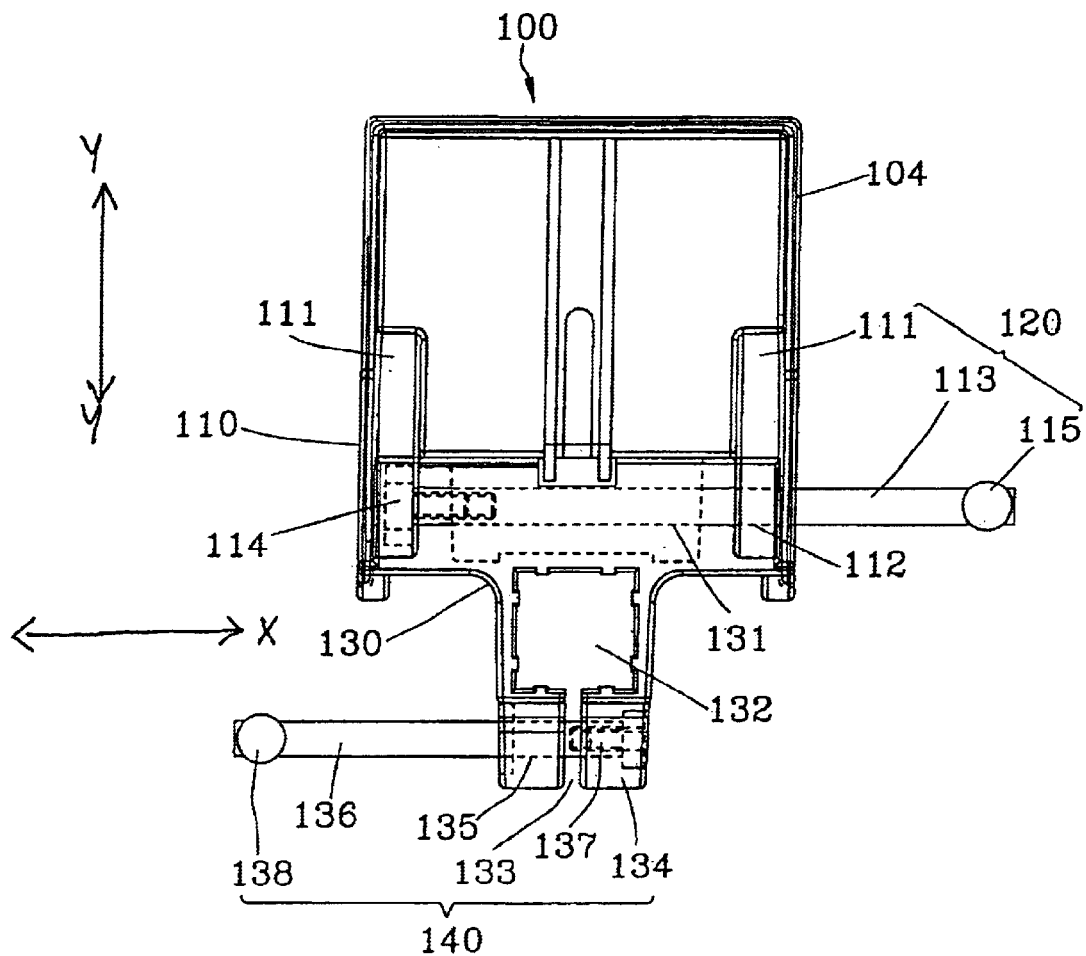
FIG. 4 is a top view of the fixing standard of the present invention.
Figure 5:
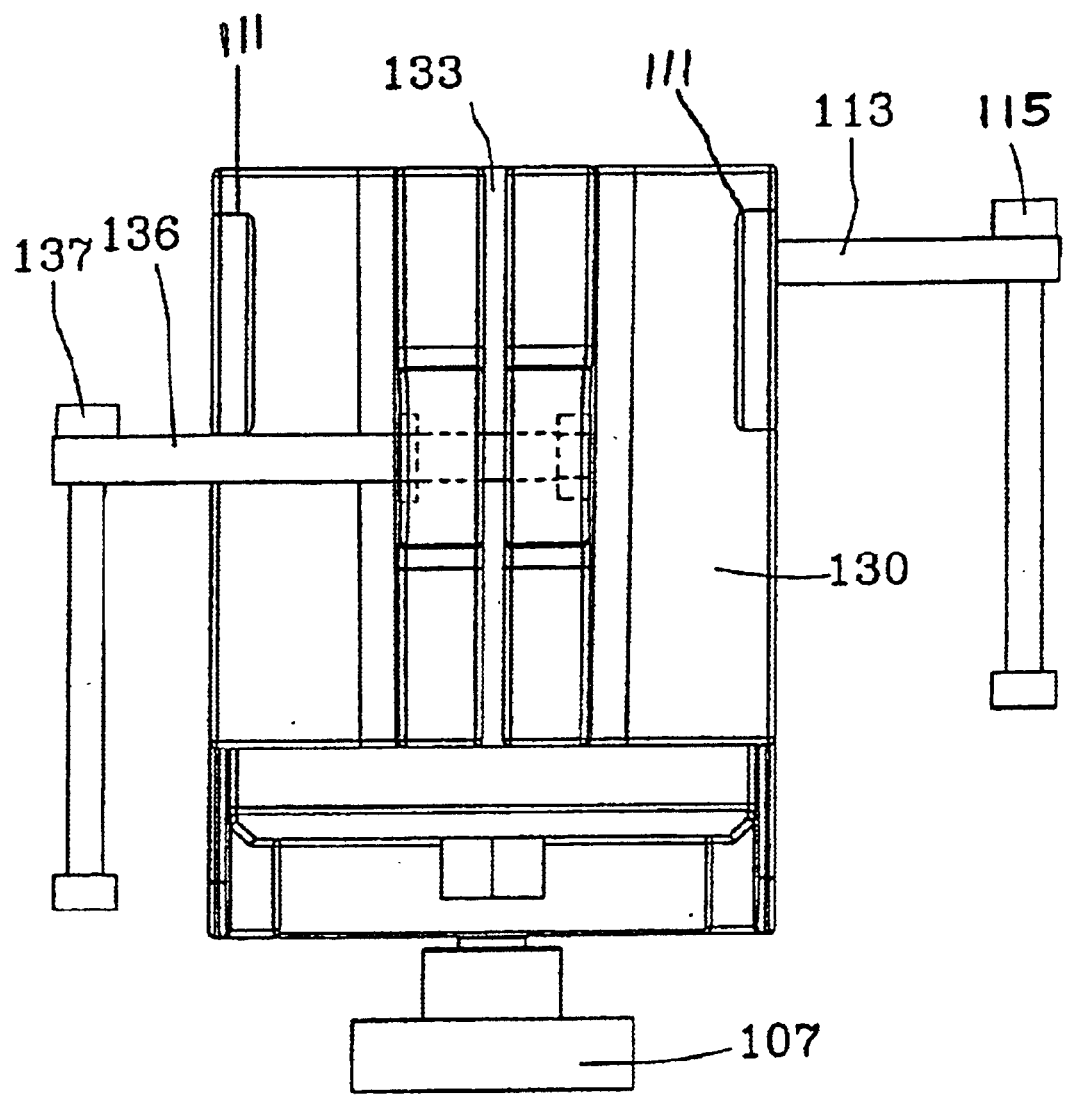
FIG. 5 is a front view of the fixing standard of the present invention.

By using the structure state above, the present invention can be used in several different situations. In order to explain present invention easily and clearly and also identify directions for reference, we define the transversal direction as a X-axis and the longitudinally direction as a Y-axis as shown in FIG. 4.

Figure 6:
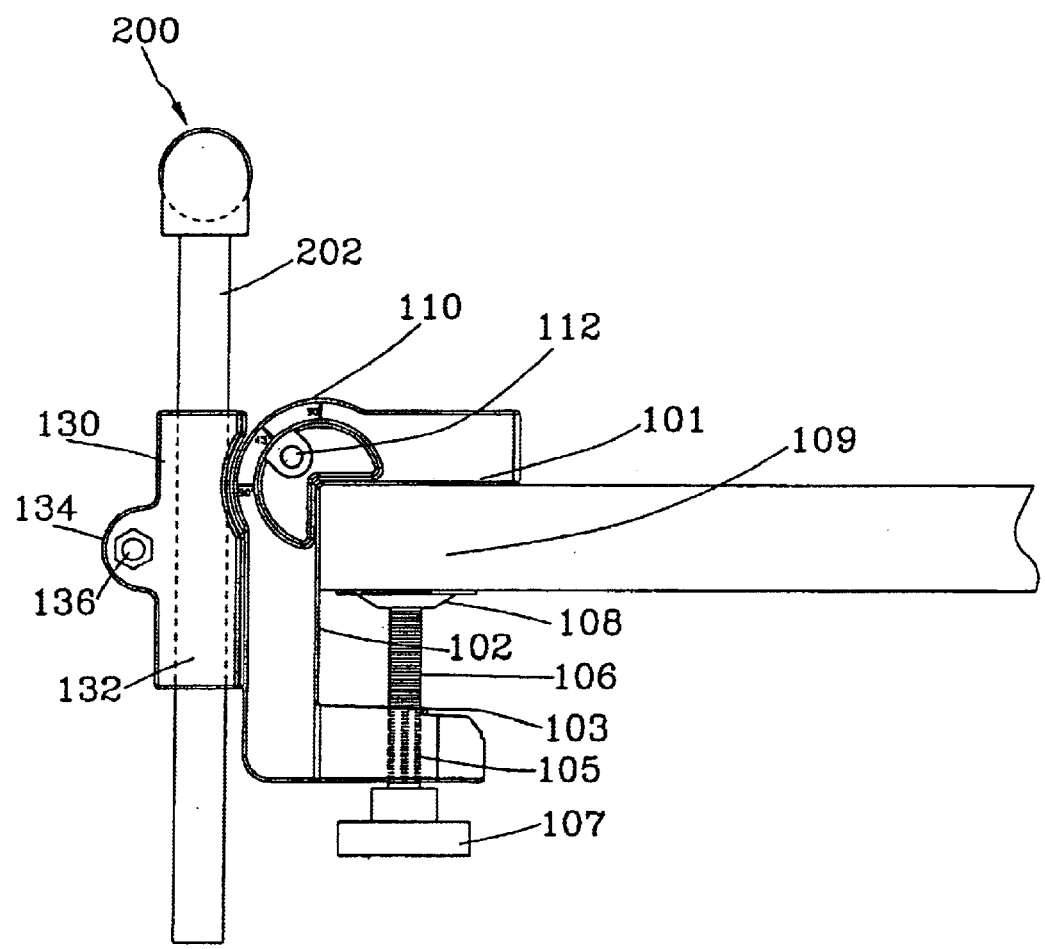
FIG. 6 is a side view of the present invention, showing the location that the all-purpose roller stand fixed beside a working table.
Figure 7:
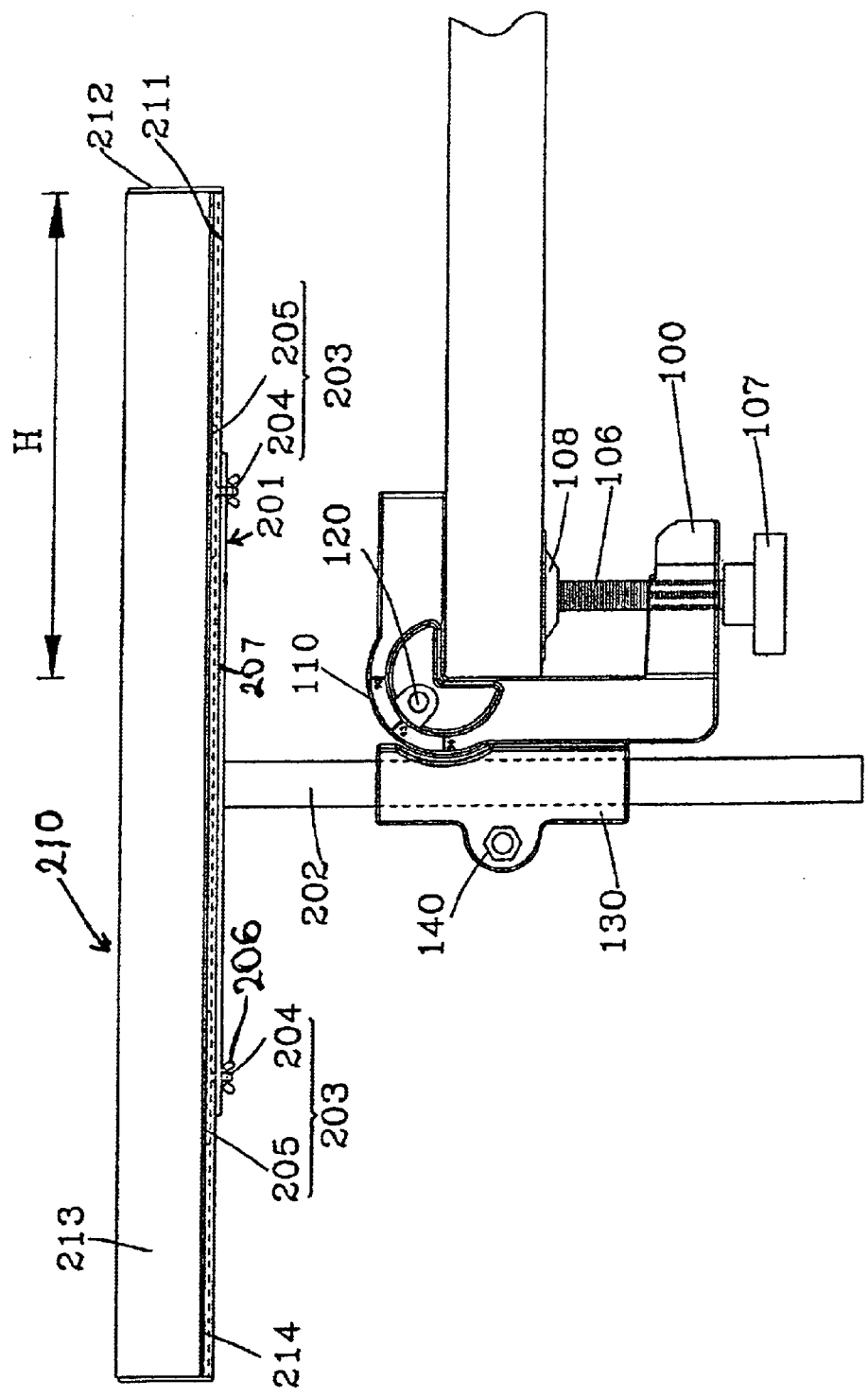
FIG. 7 is a side view of the present invention, showing another operation situation that the all-purpose roller stand fixed beside a working table.

As shows in FIG. 6 to FIG. 10, present invention can be mounted beside a working table by said pincher area 109 and fixed by said press plate 108. First, said height-fixing portion 140 is released to adjust the height and direction of said trestle 200 which is inserted in said plughole and thereafter said height-fixing portion and angle-fixing portion are fixed for use. As shown in FIG. 6, the trestle 200 is mounted to provide an X-axis working direction. Said trestle also can be remounted to provide a Y-axis working direction as shows in FIG. 7.

Figure 8:
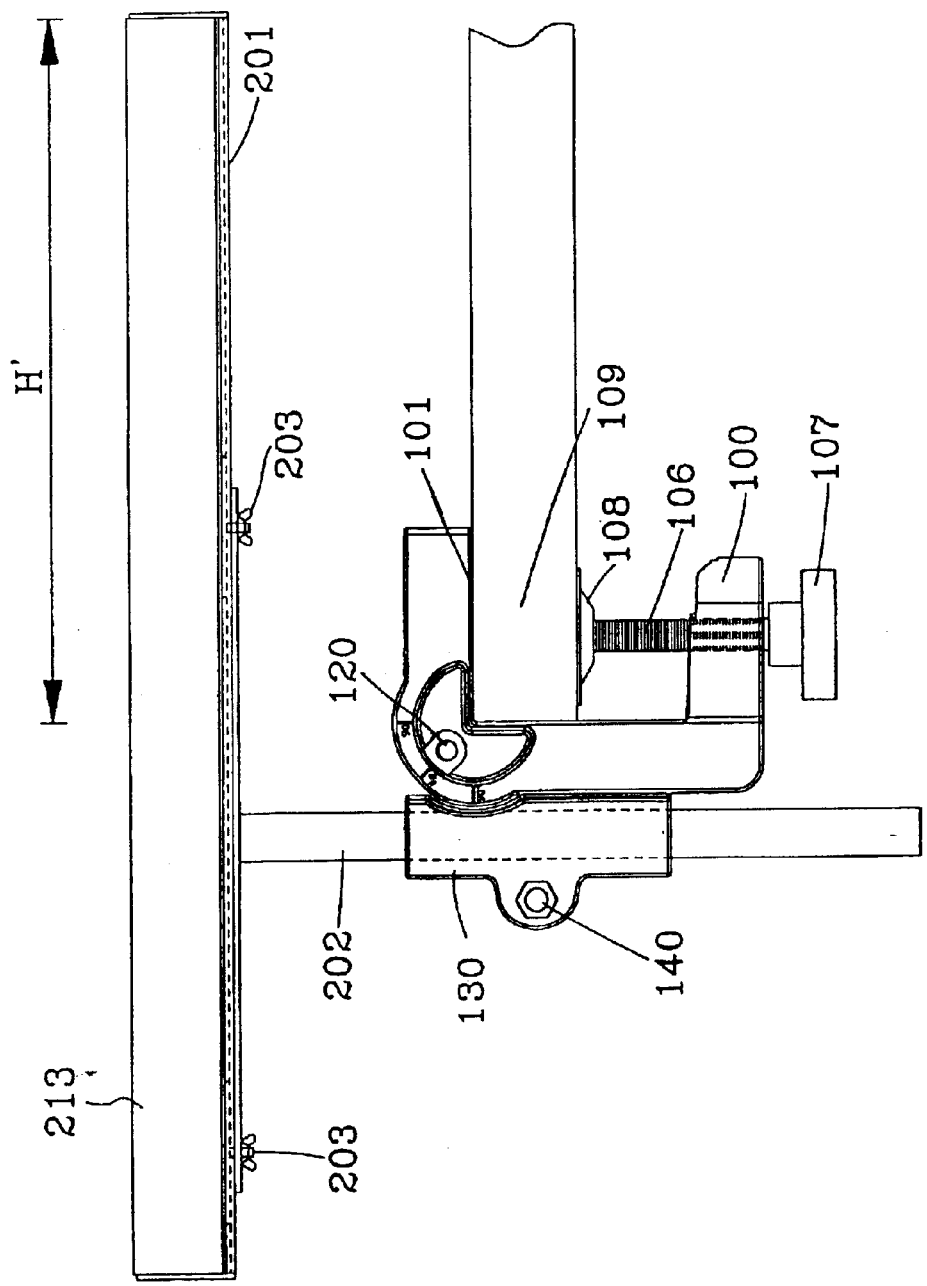
FIG. 8 is a side view of the present invention, showing the location that the all-purpose roller stand fixed beside a working table and the roller portion has been moved.
Figure 9:
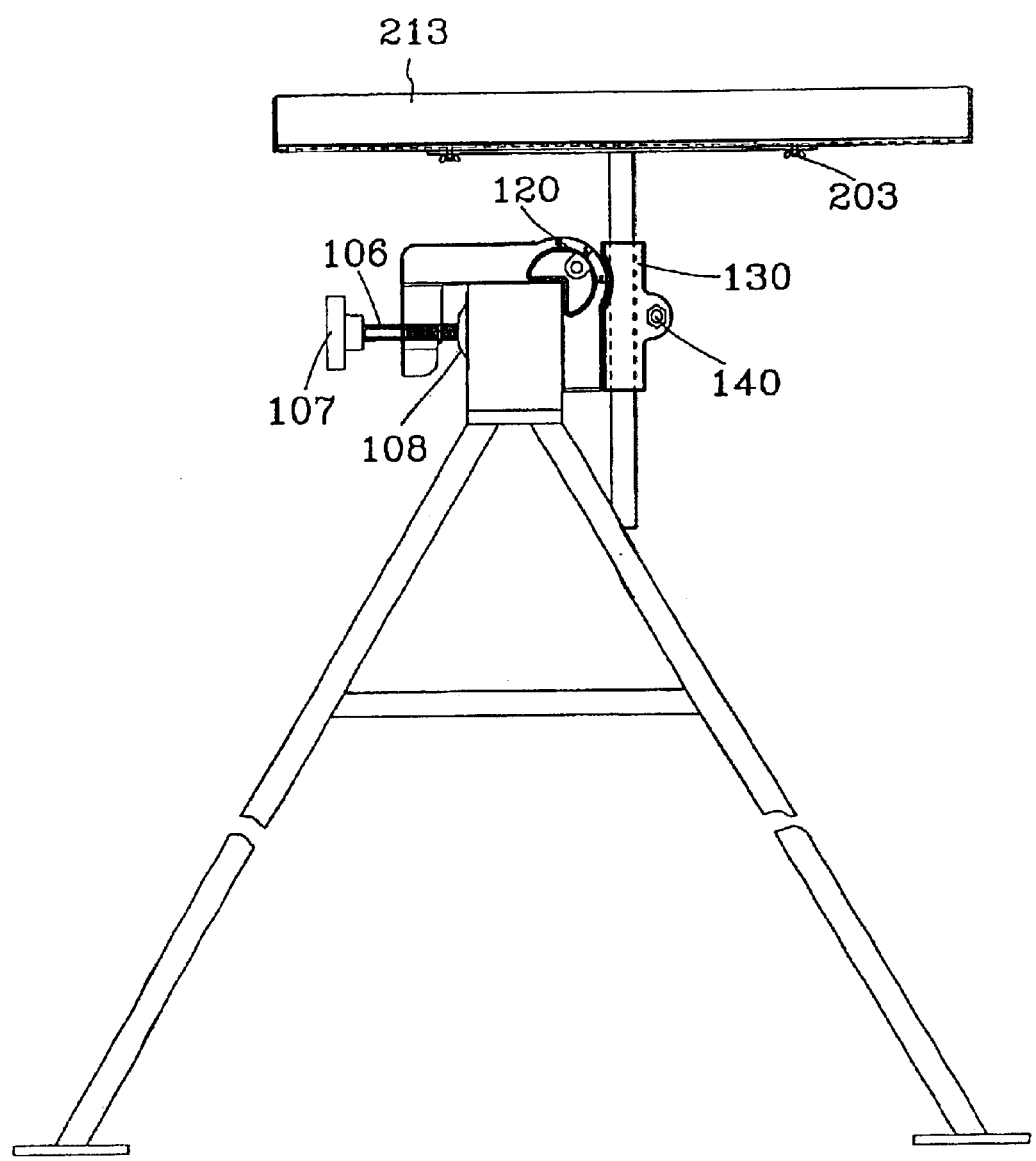
FIG. 9 is a side view of the present invention, showing the all-purpose roller stand fixed on a skid buck.
Figure 10:
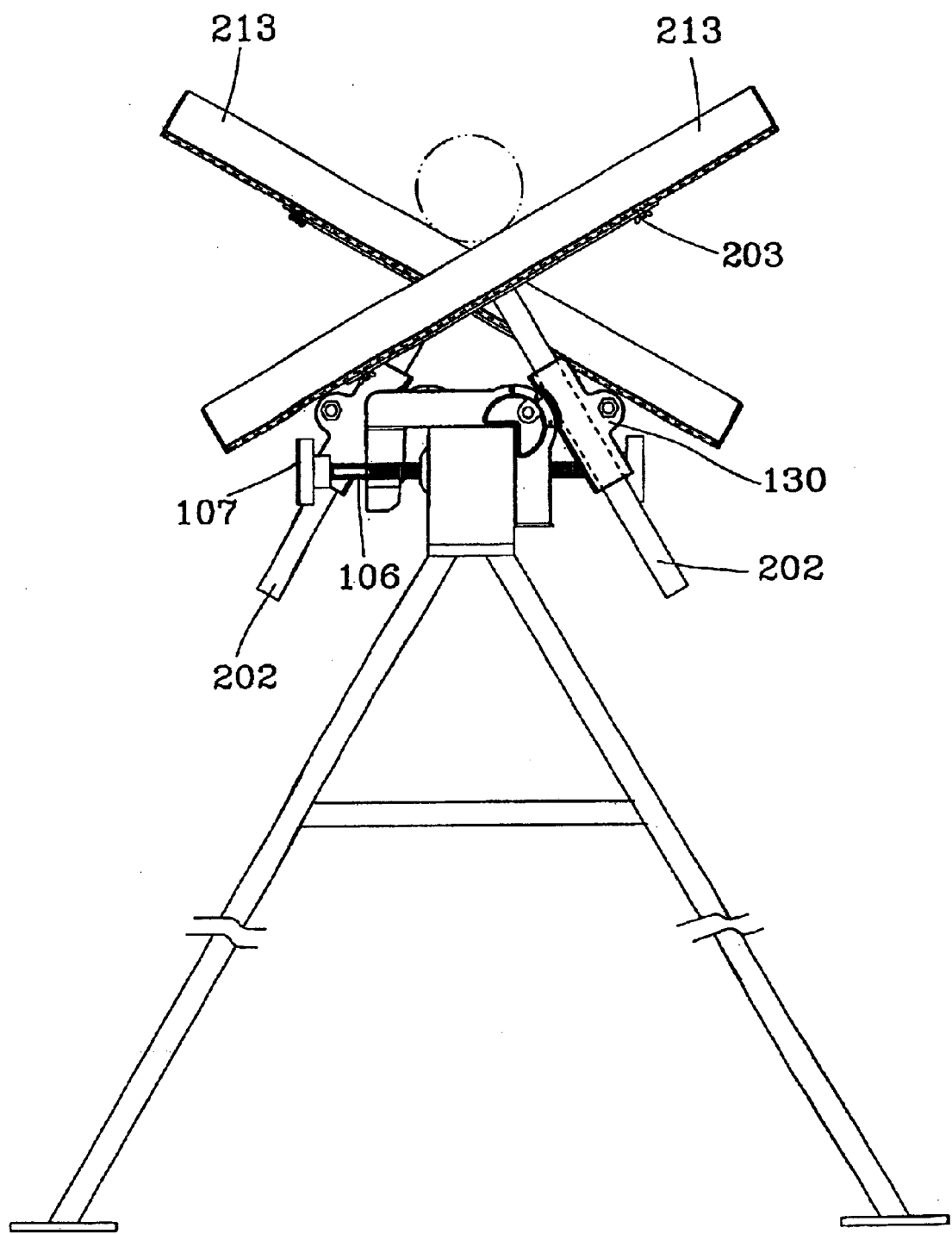
FIG. 10 is a side view of the present invention, showing another operation situation when the grade of the transversal pole has been adjusted.

As desired, trestle 200 maybe moved far away from the edge of the working table. To do this, a user can release wing nut 206 of said fixers 203 on said transversal pole 201 and move said roller portion 210 along the length of the long plate so that said rotating portion 210 can be moved as far away from the edge of the working table as desired and then tightening wing nut 206 of said fixers when said rotating portion reaches the desired location. Thus, the roller portion 210 of said trestle can be moved a distance H rather than the originally distance H and thereby offer support for a working material as shown in FIG. 8. This is a function not taught by the prior art As shown in FIG. 9, the present invention can be fixed on a skid buck also. First, said fixing standard can be mounted on the skid buck by the pincher area 109 and said height-fixing portion 140 released to permit said trestle to be adjusted to a desired operating height so that said trestle can offer the same function as the skid roller stand Said roller portion can be swivelled by releasing said angle-fixing portion and rotating said rotator. After said roller portion had been swivelled, the user can use two or more of present invention that have been swivelled in opposed directions to line up on the skid buck to support a tube shape working material as shown in FIG. 10. This is also a function not taught by the prior art.

The present invention can be mounted stability not only on a working table but also on a skid buck or other standard by fixing said fixing standard with the pincher area so that the all-purpose roller stand can be adjusted to the applied ambit. Additionally the working direction that said roller portion offers and the height of the operation can be changed by the user easily and will not be limited. Furthermore, the swivelling function of the rotator and the moveability of the roller portion is an improvement over that of the prior art.

What is claimed is:

1. An all-purpose roller stand comprising:
   a fixing standard with a pincher area adapted to be fixed on a standard:
      the fixing standard having a top portion, a side portion, a bottom portion, and a pair of embowed umbos at a junction of the top portion and the side portion;
      a pair of columns respectively fixed to an inner side of the pair of embowed umbos;
      a rotor located between the pair of columns on which the pair of columns are pivotable, the rotor having a plughole;
      a T shape trestle having a first pole and a second pole slidably engaged on a plate on an end of the first pole, the second pole having a roller portion thereon;
      wherein the first pole is inserted into the plughole on the rotor and is fixed at a selected height in the plughole by height-fixing means on the rotor located beside the plughole.

2. The all-purpose stand as defined in claim 1, wherein a first pivot extends through one of the pair of columns and the rotor and is threadedly engaged at a first end thereof to another of the pair of columns, a second end of the first pivot having a stem rotatable to fix the pair of columns at a selected location on the rotor.

3. The all-purpose roller stand as defined in claim 1, wherein the second pole including the roller portion slide transversely relative to the plate on the end of the first pole, at least one fixer engaged between the plate on the end of the first pole and a long plate on the second pole, the fixer fixing the second pole at a selected location on the end of the first pole.

4. The all-purpose stand as defined in claim 3, wherein the long plate has a long slot therein and each of two ends of the second pole have at least one fixer.

5. The all-purpose roller stand as defined in claim 3, wherein said fixer is formed by a bolt fixed on a depressor plate and a wing nut, said depressor plate being located between said long plate and the roller portion, the bolt being inserted through the long slot and the plate on the end of the first pole to permit the second pole to move along the long slot until fixed by the wing nut at a selected position relative to the plate on the end of the first pole.

6. The all-purpose roller stand as defined in claim 1, wherein said plughole further comprises a breach at a side thereof and a beetle part with a hole at each side of said breach thereof, a second pivot with screw at an end thereof and a stem at the other end thereof threaded through said two through holes.

7. The all-purpose roller stand as defined in claim 1, wherein the bottom portion has a screw whole with a lug inserted therethrough, said lug having a grip at one end thereof and a press plate at the other end thereof.

* * * * *